(No Model.)
5 Sheets—Sheet 1.
G. YELLOTT.
Hydraulic Ram and Water Wheel.
No. 234,368. Patented Nov. 9, 1880.
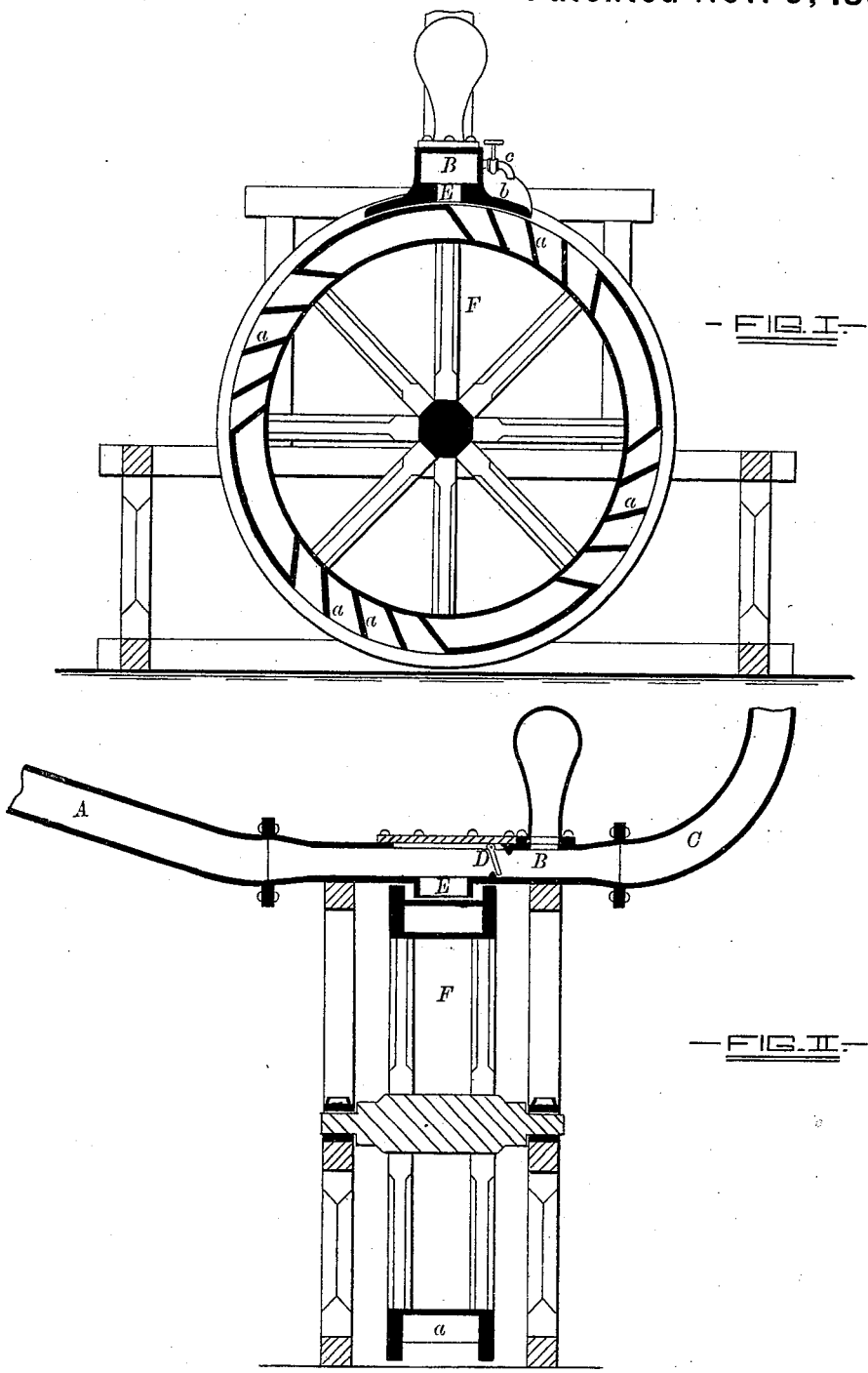
FIG. I.
FIG. II.
WITNESSES
INVENTOR
George Yellott, (No Model.) 5 Sheets—Sheet 2.
G. YELLOTT.
Hydraulic Ram and Water Wheel.
No. 234,368. Patented Nov. 9, 1880.
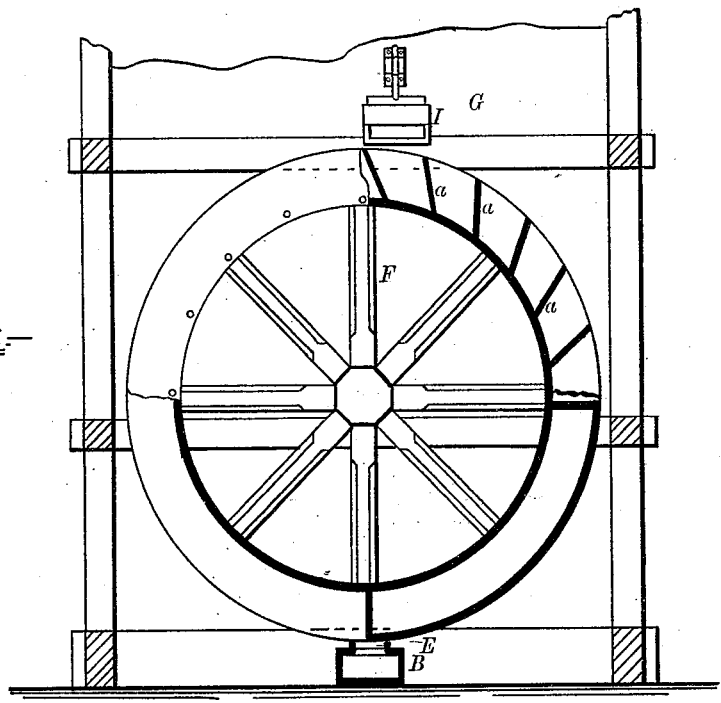
FIG. III.
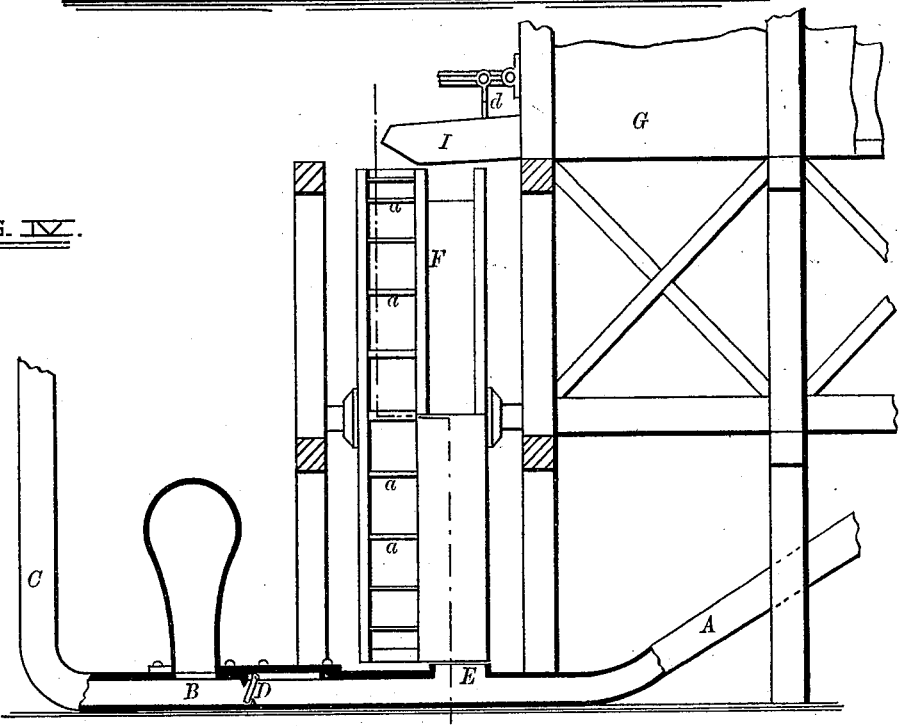
FIG. IV.
WITNESSES: Harry V. Albaugh, D. P. Cowl
INVENTOR: George Yellott, by G. H. & W. T. Howard, Atty.

(No Model.) 5 Sheets—Sheet 3.
G. YELLOTT.
Hydraulic Ram and Water Wheel.
No. 234,368. Patented Nov. 9, 1880.
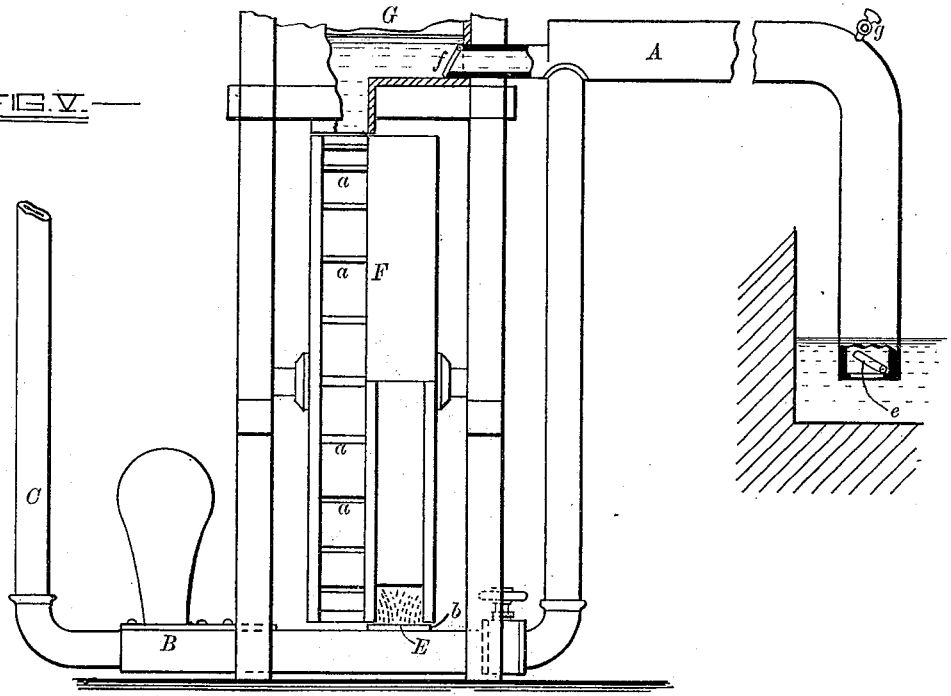
FIG. V.
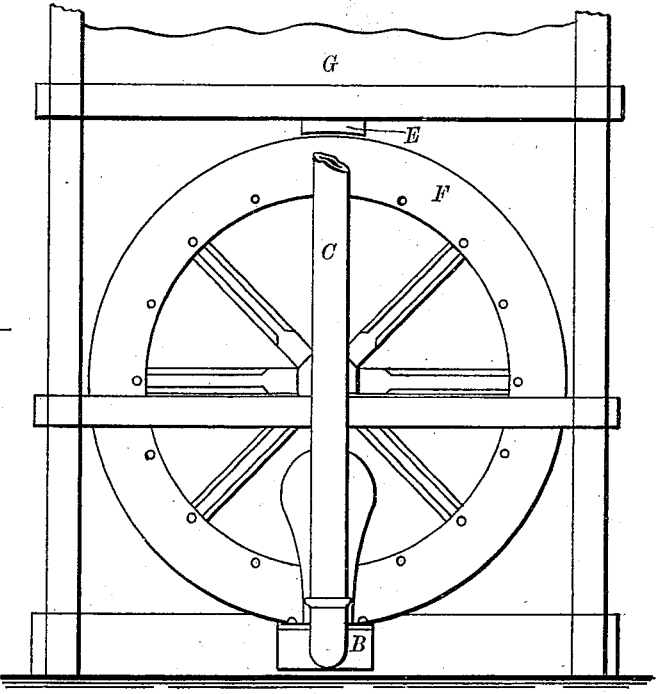
FIG. VI.
WITNESSES: Harry V. Albaugh, D. P. Cowl
INVENTOR: George Yellott, by Geo. W. T. Howard attys.

(No Model.) 5 Sheets—Sheet 4.
G. YELLOTT.
Hydraulic Ram and Water Wheel.
No. 234,368. Patented Nov. 9, 1880.
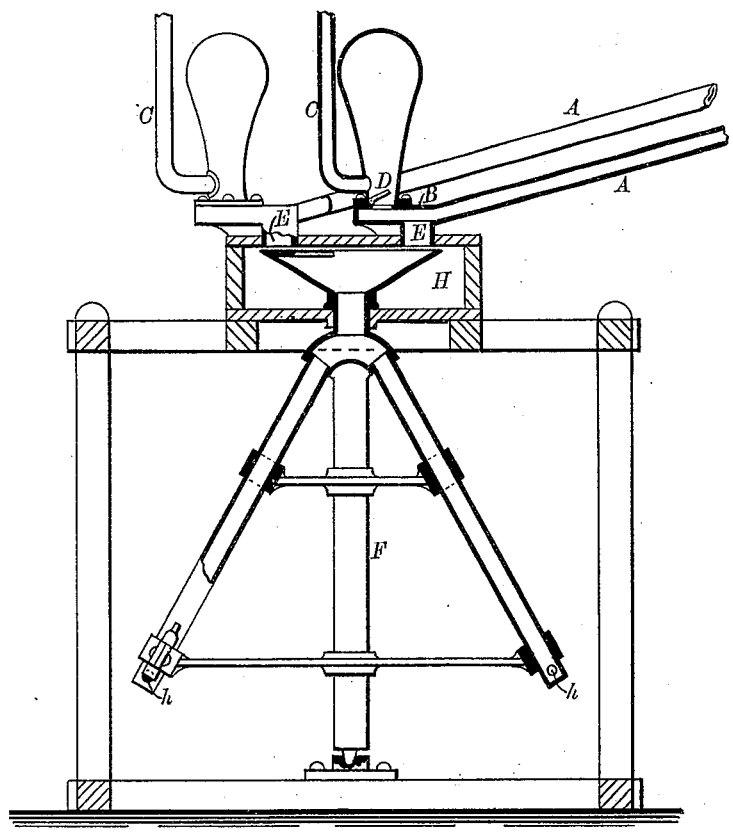
— FIG. VII. —
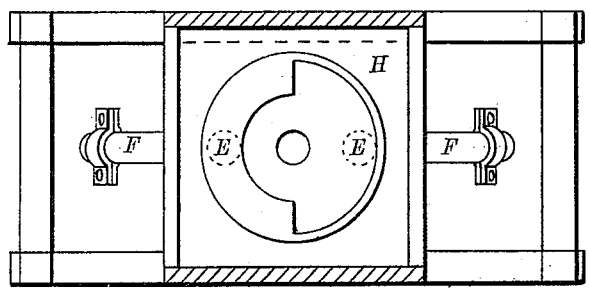
— FIG. VIII. —

(No Model.) 5 Sheets—Sheet 5.
G. YELLOTT.
Hydraulic Ram and Water Wheel.
No. 234,368. Patented Nov. 9, 1880.
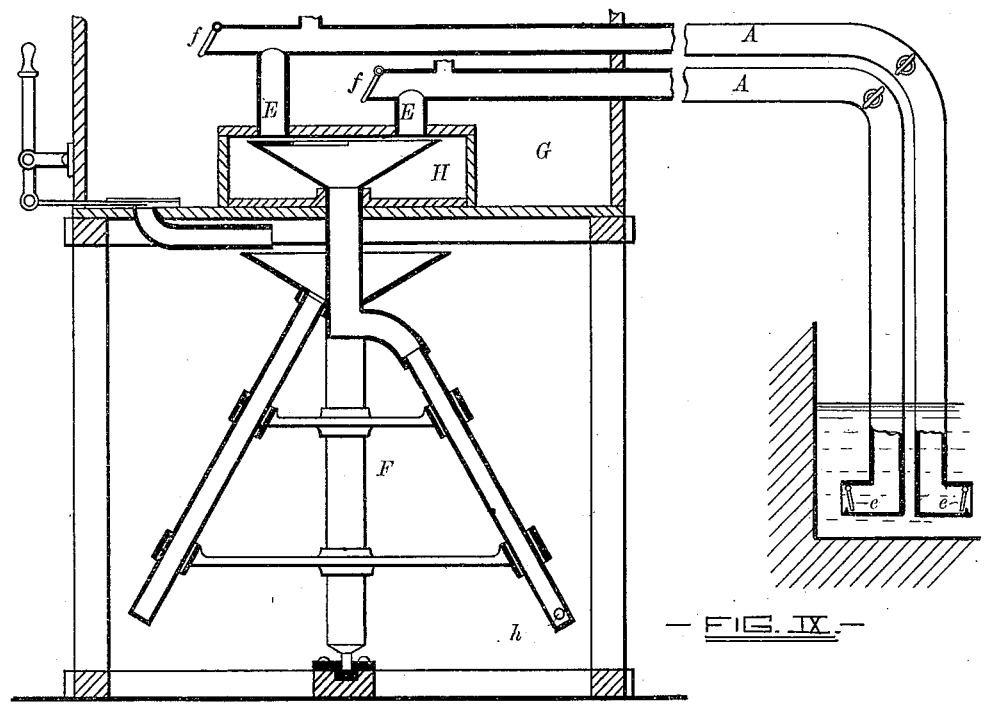
FIG. IX.
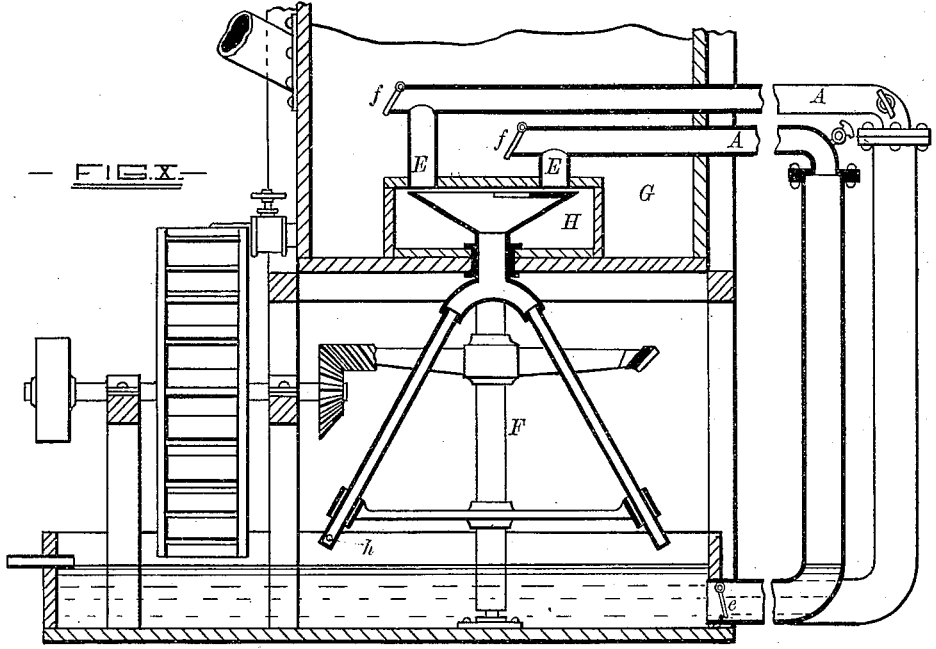
FIG. X.
WITNESSES:
Harry V. Albaugh.
D. L. Cowl.
INVENTOR:
George Yellott,
by G. H. & H. T. Howard,
attys.

UNITED STATES PATENT OFFICE.

GEORGE YELLOTT, OF TOWSON, MARYLAND.

HYDRAULIC RAM AND WATER-WHEEL.

SPECIFICATION forming part of Letters Patent No. 234,368, dated November 9, 1880.

Application filed June 28, 1880. (No model.)

*To all whom it may concern:*

Be it known that I, GEORGE YELLOTT, of Towson, in the county of Baltimore and State of Maryland, have invented certain Improvements in a Combined Hydraulic Ram and Water-Wheel, of which the following is a specification; and I do hereby declare that in the same is contained a full, clear, and exact description of my said invention, reference being had to the accompanying drawings, and to the letters of reference marked thereon.

This invention, briefly stated, consists in substituting for the valve ordinarily employed in hydraulic rams to automatically open and close the orifice of discharge in the drive-pipe a water-wheel, which, in its revolution, alternately opens and closes the said orifice, and is driven or revolved by the intermittent discharge of the water effected, or admitted of, by the revolution of the said wheel, as will hereinafter fully appear.

Prefatory to a description of my improvements it may be proper to say that when water acts by momentum in running through a long pipe its power is not to be estimated or measured by the vertical altitude of the source of supply alone, but by the weight of the moving column multiplied by its velocity in feet per second.

The water being incompressible, it acts the same as a solid body, with this difference, that power would have to be applied to a solid mass to overcome its inertia, while a body of water is easily and instantly put in motion by simply providing a means of escape from the pipe in which it is confined.

In the Montgolfier ram the valve in the drive-pipe which controls the orifice of discharge is forced to its seat, and the said orifice closed suddenly by the momentum of the moving column of water. It is, however, well known that this device can only be used on a very small scale, in consequence of the destructive action of the valve on the surrounding mechanism. For instance, if the drive-pipe was a foot in diameter and two hundred feet long, and the velocity of the column twenty feet per second, the momentum would be about two hundred and forty thousand pounds. This enormous force acting on a valve such as is used in the Montgolfier ram would destroy the valve, or the metal of the pipe surrounding the valve and against which the valve is driven.

One object of my invention, as hereinafter described, is to obviate this difficulty and render it possible to elevate large bodies of water. The other object of this invention is to utilize the waste water from the ram in effecting the rotation of a wheel capable of doing useful work.

In the further description of my said invention which follows, reference is made to the accompanying drawings, forming a part hereof, in which—

Figures I and II are sectional elevations, as seen from different points, of a ram combined with an overshot water-wheel constructed in accordance with my improvements.

The remaining figures of the drawings illustrate modifications in the construction of the apparatus, as hereinafter described.

Similar letters of reference indicate similar parts in all the views.

Referring to Figs. I and II, A is the drive-pipe, extending from the source of the water-supply to the ram-chamber B. C is the water-delivery pipe, leading from the ram-chamber to a point to which the water is to be elevated. D is a valve situated in the ram-chamber, which is opened by the flow of water.

The ram-chamber B is provided with a supplemental discharge-orifice, E, which, under circumstances hereinafter described, admits of the passage of the whole or a portion of the water delivered to the ram-chamber to an overshot water-wheel, F, located directly below the said chamber. The water-wheel F is of peculiar construction—that is to say, sections of its periphery are fitted with buckets $a$, whereby the wheel is revolved, while the remaining sections present a smooth convex surface to the under side of the ram-chamber, which is provided with a concave plate, $b$. The width of the plate $b$ should be less than the distance between the flanges of the water-wheel, in order that the curved plate may not entirely close the spaces between the flanges. If this were not the case, the passage of water to the buckets would be impeded by the compression of air in the same.

The number of the bucketed and smooth-surfaced sections which follow each other in alternation are dependent on the size and circumference of the wheel; but there should never be less than three of each kind, so that when the buckets in one section are being filled those in another section are being emptied.

The operation of this apparatus is as follows: When a bucketed section of the water-wheel is under the orifice E, the whole or a portion of the water delivered to the ram-chamber passes to the buckets of the wheel and revolves it; but upon a smooth section being carried to underneath the chamber in the revolution of the wheel the discharge through the orifice E is stopped, and the water is made to pass directly to the air-vessel, and thence to the delivery-pipe C, which conducts it to a reservoir, or to some place from which it may be used.

By means of this construction no portion of the water flowing through the drive-pipe is wasted, as is the case in the Montgolfier ram, but is conducted alternately to the air-vessel or delivery-pipe and to the water-wheel. The momentum of the wheel is sufficient to effect its movement while the smooth sections of its rim are passing the orifice E.

To put a large and heavy wheel in motion when it is standing with a smooth section under the orifice E, a cock, c, is used to fill the buckets below the end of the plate b.

A modified construction of the invention is illustrated in Figs. III and IV, which represent sectional views of the apparatus as seen from different points. In this modification two wheels are used, one having buckets distributed over its entire circumference, and the other without buckets, but provided with a series of smooth projecting surfaces similar to those described in connection with the wheel illustrated in Figs. I and II. The two wheels are secured to the same shaft, and consequently revolve together. The object of this modification is to utilize a stream of water of any kind to assist in securing for use water from a spring of limited capacity. With this view I conduct the water which is not suitable for drinking purposes to a penstock, G, and thence, by means of a spout, I, having a suitable gate, d, to the bucketed wheel. The spring-water is led through the drive-pipe A to the ram-chamber B, the supplemental aperture of which is beneath the other wheel and controlled by the smooth projections on the same. This modification may be advantageously used in cases where a water-wheel is already in operation, as a powerful ram is obtained without diminishing the power of the wheel.

The construction of the apparatus illustrated in Figs. V and VI differs only from that shown in Figs. III and IV in that the entire body of water used is derived from the same source by means of a siphonic pipe. In this design the penstock is fed by a portion of the water passing through the drive-pipe.

To properly effect the result desired in this design the short leg of the siphon is furnished with a valve, e, and the portion of the drive-pipe entering the penstock with a valve, f, which latter valve must be kept below the water-line in the penstock to prevent leakage of air.

In charging the siphonic drive-pipe the valve f is opened and the air in the said pipe allowed to escape through a valve, g.

Figs. VII and VIII represent two views of another modification of my invention. In this case two drive-pipes are used, and also two ram-chambers with their attachments.

The supplemental discharges enter a casing, H, made strong and air-tight, and intended to be kept filled with water. The water-wheel is of the reactionary type, and consists of a vertical hollow shaft having hollow communicating arms, the upper end of which shaft enters the casing H, and is of funnel shape. The upper edge of the funnel is provided with a semicircular plate, which corresponds in its action with the smooth projecting sections of the wheel first described in cutting off alternately the supplemental discharges of the two rams. The water passes down through the hollow arms of the wheel, and is finally discharged through lateral openings h, which are controlled by suitable gates.

When the supplemental discharge-orifice of one drive-pipe is closed the corresponding orifice in the other drive-pipe is open. Consequently the flow of water to the reactionary wheel is continuous, or nearly so.

The centrifugal force of the water leaving the discharge-openings at the ends of the arms accelerates the movement of the water through the wheel. Therefore the water is, as it were, pumped downward.

In Fig. IX the siphon principle is applied to the reactionary wheel shown in Figs. VII and VIII, and one arm of the wheel is supplied with water from a penstock, which enters a funnel situated on the central shaft and below the casing.

In all cases where a reactionary wheel is employed it is designed to apply gearing to the said wheel to accomplish useful work.

In the arrangement of the apparatus as shown in Fig. X a portion of the water taken up by the siphons is from a tank which receives the discharge from the reactionary wheel.

I claim as my invention—

1. In combination with the ram-chamber of a hydraulic ram, a water-wheel adapted in its revolution to alternately open and close the waste-water orifice in the said chamber, and thereby effect the alternate movement of the water from the drive-pipe toward the ram delivery-pipe and to said wheel, whereby in the latter action of the water the said wheel is caused to revolve, substantially as herein specified.

2. In combination with the ram-chamber of a hydraulic ram, a water-wheel having at its periphery a series of bucketed and a series of plain sections, the said plain sections being adapted as valves to cut off the discharge of waste water from the said chamber, and thereby conduct the body of water from the drive-pipe of the ram toward the air-vessel of the same, and the said bucketed sections to receive the waste water, and thereby effect the revolution of the said wheel, substantially as herein specified.

3. A hydraulic ram the chamber of which has a circular concave surface, adapted to fit, practically water-tight, the circumference of a water-wheel, the said concave surface having therein an orifice for discharging water from the said chamber to the said wheel, substantially as herein specified.

GEO. YELLOTT.

Witnesses:
HARRY V. ALBAUGH,
ARMISTEAD R. YELLOTT.